Oct. 25, 1927.  1,647,009
R. M. LOVEJOY
SPRING SUSPENSION FOR VEHICLES
Filed Jan. 4, 1926
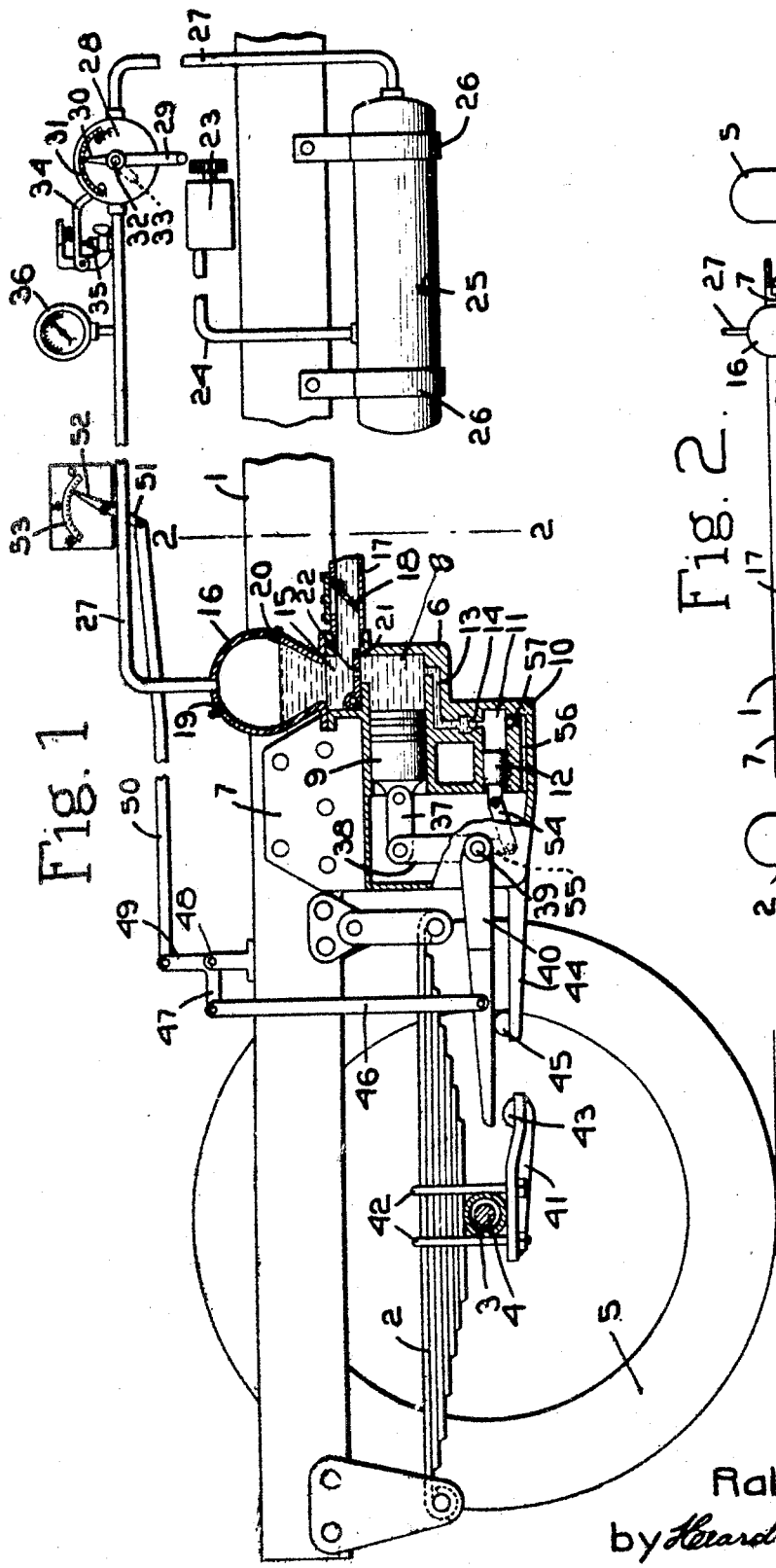
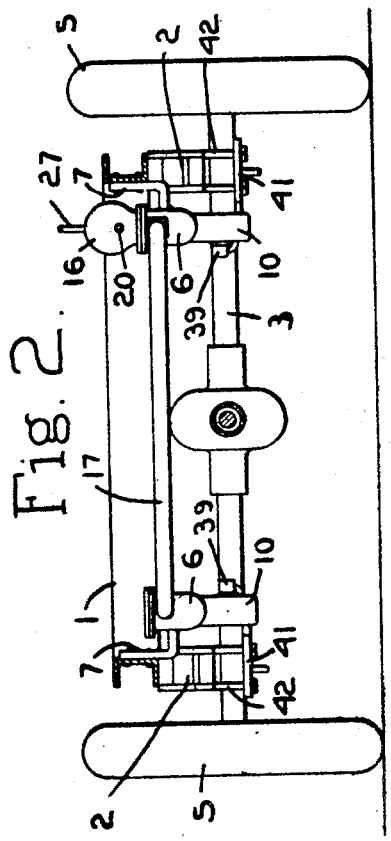
Inventor
Ralph M. Lovejoy
by Heard Smith & Tennant.
Attys Patented Oct. 25, 1927.

1,647,009

UNITED STATES PATENT OFFICE.

RALPH M. LOVEJOY, OF BOSTON, MASSACHUSETTS.

SPRING SUSPENSION FOR VEHICLES.

Application filed January 4, 1926. Serial No. 79,169.

This invention relates to improvements in spring suspensions for vehicles and the general object thereof is to provide a vehicle having usual springs located intermediate of the load supporting means and the running gear with novel supplemental fluid-spring mechanism operable resiliently to sustain a portion of the load when the springs are flexed beyond a predetermined amount.

A further object of the invention is to provide means for indicating the weight of the load imposed upon the fluid-spring mechanism and also in providing means, preferably manually operable, for controlling the pressure of the fluid-spring mechanism so that the action of the fluid-spring mechanism may be correlated to the load imposed upon it.

Another object of the invention is to provide a fluid-spring mechanism of the character specified, with power-multiplying lever mechanism operable by the relative movement of the load supporting means and running gear which will increase the effective action of the fluid-spring mechanism.

Another object of the invention is to provide a construction in which the lever mechanism will become operative only when the springs have been flexed beyond a predetermined amount.

A further feature of the invention consists in providing indicating mechanism, operable by the movement of the lever mechanism, to indicate to the operator of the vehicle the amount of load imposed upon the supplemental spring mechanism, and also in providing manually operable means for controlling the air pressure of the supplemental spring mechanism so that the action of the supplemental spring mechanism will be correlated to the weight of the load imposed upon it.

Another feature of the invention consists in providing suitable cushioning mechanism for maintaining said lever mechanism in inactive position until a predetermined load has been placed upon the load supporting means and also in providing cushioning means to engage said lever mechanism when the springs have been flexed beyond a predetermined amount, thereby preventing noise which otherwise would occur when the lever mechanism is brought into action.

Other objects and features of the invention will more fully appear from the following description and the accompanying drawing and will be particularly pointed out in the claims.

The present invention is illustrated herein as applied to the chassis of a vehicle, such as a heavy bus or truck, upon which loads are imposed widely differing in weight. If such heavy busses or trucks are provided with springs of sufficient resilience to enable the vehicle to ride comfortably with no load, or with a light load, the springs will become so flexed when the truck is more heavily or fully loaded that the load supporting means will bottom upon the running gear or axle when subjected to the usual jounces in the road. If, on the other hand, springs of sufficient rigidity are used to sustain properly the weight of a heavy load, the bus or truck will not ride comfortably as the jouncing will be transmitted to the passenger or other load. The object, therefore, of the present invention is to provide a vehicle, such as a bus or truck, with springs of sufficient resilience to enable the vehicle to ride comfortably when unloaded or lightly loaded, with supplemental fluid-spring mechanism so arranged as to become effective when the load upon the springs exceeds a predetermined amount, and also in providing means for indicating the weight of the load imposed upon the fluid-spring mechanism, with means, preferably under the control of the operator, for varying the pressure of the fluid-spring mechanism in correlation to the increasing or decreasing weight of the load. By reason of this invention the operator can readily control the spring suspension of the vehicle as passengers are taken on or let off so that the passengers occupying the vehicle will at all times have a comfortable ride and not be subjected to the undesirable jouncing of the vehicle as it passes over usual rough roads.

A preferred embodiment of the invention is illustrated in the accompanying drawing as applied to the chassis of a bus or truck, but it will be understood that the invention may be employed in other types of vehicles to which it may be applicable and may also be employed effectively to cushion the relative movement of members of any other type of construction within the meaning and scope of the claims.

In the drawing:

Fig. 1 is a view, partly in diagrammatic form, of the invention as applied to the chassis of a bus; and, Fig. 2 is a sectional view of the rear portion of the chassis, showing the rear axle, the frame supported thereupon by springs and the fluid-spring mechanism embodying the invention applied thereto.

The chassis illustrated in the drawing comprises a load supporting means of which the usual side frames 1 alone are shown as being supported by leaf springs 2 upon the axle housing 3 in which the axle 4 of the wheels 5 is mounted, this being the usual spring suspension of a vehicle.

The supplemental fluid-spring mechanism as illustrated comprises casings 6 provided with upwardly extending webs or flanges 7 which are riveted, or otherwise secured, to the side frames 1 of the chassis. Each casing 6 is provided with a cylinder 8 having a piston 9 reciprocable therein and a depending integral portion 10 providing a drip chamber with a pump cylinder 11 having a piston 12 reciprocable therein. A conduit 13, which desirably may be formed by coring the casting, establishes communication between the cylinder 11 of the pump and the cylinder 8 of the air spring mechanism, a suitable valve, such as a ball valve 14 in said conduit, serving to prevent the flow of liquid from the cylinder 8 to the pump cylinder while permitting liquid to be forced from the pump cylinder to the main cylinder 8. The casing 6 is extended above the cylinder to provide a chamber 15 and a dome 16 is superimposed upon one of the casings 6. A pipe 17 leads from the chamber 15 of one of the casings to a like chamber 15 of the other casing and is provided with a suitable check valve 18 having an aperture therethrough to permit a restricted flow of the fluid from the chamber 15 to the chamber of the other casing. The other casing may be provided with a flat closure plate instead of a dome in which case the dome 16 will provide an air chamber for both fluid springs.

Each casing is provided with a filler opening closed by a plug 19 in order to permit the introduction of liquid, preferably oil, into the dome and cylinder. Each dome is also provided with an outlet opening having a plug 20 which may be removed in order to establish a desired level of liquid in the dome. By reason of this construction the dome 16 constitutes a reservoir which communicates with the cylinder of one of the casings and as the chambers 15 of both casings communicate the dome 16 constitutes a liquid reservoir for both casings. The upper portion of the dome above the level of the liquid is adapted to be supplied with air under pressure and thereby to provide an air spring for the vehicle under the reciprocation of the piston 9. Inasmuch as the casing and dome thus assembled contain both liquid and air the assemblage may be conveniently referred to as a fluid-spring mechanism. Desirably a valve, such as a flap valve 21, is interposed between the cylinder and the chamber 15 and provided with a central port or ports 22. This valve, therefore, operates upon compressive movement of the piston to permit the liquid to flow from the cylinder into the reservoir against the pressure of air in its dome, but restricts the flow of liquid from the reservoir into the cylinder upon movement of the piston in the opposite direction.

Any suitable means may be provided for supplying air under pressure to the dome of the reservoir. Usually large busses and trucks are provided with air brake mechanism including a storage cylinder for compressed air and a suitable pump for supplying compressed air to the storage cylinder. Such a compressor pump 23 is diagrammatically illustrated in Fig. 1 as connected by a pipe 24 with a usual compressed air tank 25 which is suspended from the frame in any suitable manner, as by straps 26. A pipe 27 leads from the compressed air tank to the top of the dome 16, a suitable reducing valve 28 being interposed in the pipe 27 for the purpose of controlling the pressure imposed upon the liquid in the reservoir and the cylinders. This reducing valve desirably is mounted upon the instrument board of the vehicle.

Any suitable form of reducing valve may be employed. As illustrated herein the reducing valve is provided with a manually operable handle 29 having an index finger 30 which is rotatable over a graduated sector 31 adapted to indicate to the operator the air pressure which is imposed upon the liquid in the cylinder. By swinging the lever from the left to the right the air pressure in the dome may be increased to any desired degree and maintained at a desired pressure by arresting the movement of the arm at a desired point. In order to relieve the pressure in the dome when it is desired to reduce the air pressure in the cylinder the shaft 32 of the valve-operating arm is provided with an extension 33, shown in dotted lines in Fig. 1, which, when the lever is moved to off position, will engage and raise a lever 34 to open a vent valve 35 so that the air under pressure in the dome may be exhausted. Desirably a pressure gauge 36 mounted upon the instrument board communicates with the pipe 27 so that the operator will be enabled to read the pressure which is imposed upon the liquid in the reservoir and cylinders.

The cylinder 9 of the fluid-spring mechanism may be connected to the running gear of the vehicle, which is movable relatively to the load supporting means, in any suitable manner. Desirably a multiplying lever mechanism is interposed between the cylinder and the running gear to increase the effective air spring action of the mechanism. As illustrated herein the piston 9 is pivotally connected to a link 37 which in turn is pivotally connected to one arm 38 of a bell crank lever which is fulcrumed upon a shaft 39 journalled in the casing. The other arm 40 of the bell crank lever is adapted to be engaged by a suitable part of the running gear. As illustrated herein the end of the lever arm 40 extends over the end of a plate 41 which is secured to the axle housing by the usual U-shaped bolts 42 of the spring chair. The plate 41 is provided with a resilient buffer 43, of rubber or other suitable material, resiliently to engage the end of the arm 40, thereby preventing rattling of the parts when brought into engagement and also acting to supplement the cushioning movement of the fluid-spring mechanism. The lever 40 desirably is normally held out of engagement with the rubber buffer 43 by suitable mechanism, such as an arm 44 projecting from the casing beneath the lever and provided with a cushioning buffer 45 of rubber or other suitable material.

By reason of this construction it will be obvious that the fluid-spring mechanism will remain inactive until the springs have been flexed beyond a predetermined amount which is determined by the distance the end of the lever is supported by the buffer stop 45 above and out of engagement with the buffer 43. Thus when the bus or truck is unloaded the load supporting means will be carried upon the springs 2 and the bus will ride comfortably when unloaded or lightly loaded. When, however, the vehicle is more heavily loaded the engagement of the end of the lever 40 with the resilient buffer 43 will, upon further flexure of the springs, cause the oscillation of the lever 40, thereby forcing the piston 9 inwardly of the cylinder, thus forcing the liquid upwardly through the port leading to the chamber 15 and the dome reservoir 16 against the air pressure in the dome. During such movement of the piston the flap valve 21 is raised and permits the liquid to flow freely into the chamber 15 and reservoir 20. Upon reverse movement of the piston 9 as the arm 40 descends the liquid in the reservoir flows more slowly through the restricted port 22 in the flap valve 21 producing a relatively smaller pressure upon the piston 9. By properly proportioning the area of the port 22 such flow of liquid therethrough may be provided as to enable the fluid-spring mechanism to act as a shock absorber to damper rebounding action of the spring. As the arm 40 of the bell crank lever will be raised proportionately to the flexure of the spring under an increasing load upon the load supporting means of the vehicle an accurate indication of the weight of the load imposed upon the fluid-spring mechanism may be indicated by suitable mechanism connected with the lever mechanism.

The preferred indicator mechanism illustrated in the accompanying drawing comprises a vertical strut or link 46 pivotally connected to the lever arm 40 at any desirable distance from its fulcrum, the upper end of the strut or link 46 being pivotally connected to one arm 47 of a bell crank lever which is fulcrumed upon a suitable bracket 48 on the frame, the other arm 49 of the bell crank lever being pivotally connected by a suitable rod 50 to an indicator lever 51 having an index finger 52 arranged to oscillate over a graduated sector 53 which may be conveniently mounted upon the instrument board of the vehicle. The operator will therefore be apprised of the weight of the load which is imposed upon the supplemental fluid-spring of the vehicle and by properly manipulating the handle 29 of the restricting valve may increase the pressure admitted from the compressed air tank through the pipe 27 into the dome of the fluid-spring mechanism until the index finger 53 indicates the proper proportion of the weight of the load to be supported by the fluid-spring mechanism to provide an easy riding of the vehicle. Desirably the indicator mechanism may be so arranged that the best riding condition will be indicated when the indicator 51 is in vertical position. Upon the discharge of any substantial part of the load the flexure of the springs will be substantially reduced and the lever arm 40 permitted to descend, thereby moving the index finger 53 from the position where it indicates the best riding condition. The operator may then turn the controller arm 25 of the reducing valve to off position so that the arm 33 of the shaft of the reducing valve will raise the arm 34 of the vent valve and permit air to escape from the dome. Ordinarily such escape of the air will be so rapid that it will be necessary again to open the reducing valve sufficiently to restore the proper pressure in the dome of the fluid-spring mechanism. This, however, can be done almost instantly without any perceptible action of the air spring upon the load supporting means during the time required for such manipulation.

A pump is provided, as heretofore stated, for collecting any drip of liquid which may pass by the piston 9 and returning such drip to the cylinder 8 and the reservoir which communicates therewith. The simple and effective pumping mechanism for accomplishing this purpose, which is illustrated herein, comprises the cylinder 11 and piston 12 in the depending portion of the casing 6, the piston 12 being connected by a link 54 to an arm 55 forming part of the bell crank lever which may, if desired, comprise an extension of the bell crank arm 38. A suitable intake conduit 56 leads from the bottom of the drip chamber to the cylinder 11 and communicates therewith through a port 57 controlled by a check valve, such as a ball valve.

In the operation of the fluid-spring mechanism, therefore, the piston 12 will be reciprocated in unison with the reciprocation of the piston 9, but in the opposite direction. The suction stroke of the piston 12 will draw oil through the intake conduit 56 and port 57 into the cylinder 11 while the compression stroke of the piston will first seat the check valve in the port 57, then raise the check valve 14 and force the fluid from the cylinder 11 into the cylinder 8. By reason of this construction wastage of liquid by leakage past the cylinder 9 is prevented and a uniform amount of liquid maintained in the cylinder 8, chamber 15 and dome reservoir 20. As the chambers 15 of a pair or more of such liquid-containing casings are connected by the pipe 17, uniform action of the fluid-spring mechanism is maintained and action of the pistons 9 under the influence of the air under pressure uniformly controlled.

Preferably a single air dome reservoir is provided for a plurality of cylinders and pistons as the effective action of the air pressure will be distributed to the different cylinders if one wheel of the vehicle only strikes an obstruction or drops into a depression. Thus the effective shock absorbing action of the fluid-spring mechanism is increased.

It will be readily understood that by reason of the construction above described a controllable spring suspension is provided which will enable the load supporting means of the vehicle to ride easily either when unloaded or loaded to any extent within the capacity of the vehicle; that by suitable regulation under the control of the operator the desired proportion of the weight of the load may be supported upon the fluid-spring mechanism, and further that the fluid-spring mechanism also acts when in use as a shock absorbing medium to prevent jolting of the load when the vehicle is passing over rough roads.

It will be understood that the particular embodiment of the invention disclosed herein is of an illustrative character and is not restrictive, and that various changes in form, construction and arrangement of parts may be made within the spirit and scope of the following claims.

Having thus described the invention, what is claimed as new, and desired to be secured by Letters Patent, is:

1. In a vehicle comprising load supporting means and springs supporting the same upon the running gear of the vehicle, supplemental fluid-spring mechanism intermediate of said load supporting means and said running gear operable resiliently to sustain a part of the load upon said springs only when the weight of the load flexes the springs beyond a predetermined amount and means under control of the operator while in driving position for varying the effective action of said fluid-spring mechanism in correlation to the load imposed thereupon.

2. In a vehicle comprising load supporting means and springs supporting the same upon the running gear of the vehicle, supplemental fluid-spring mechanism intermediate of said load supporting means and said running gear operable resiliently to sustain a part of the load upon said springs only when the weight of the load flexes the springs beyond a predetermined amount, means for indicating the amount of the load imposed upon said fluid-spring mechanism and manually operable means for varying the effective action of said fluid-spring mechanism.

3. In a vehicle comprising load supporting means and springs supporting the same upon the running gear of the vehicle, fluid-spring mechanism carried by said load supporting mechanism including power-multiplying lever mechanism and means upon said running gear positioned to be engaged by said lever mechanism only when the weight of the load flexes the springs beyond a predetermined amount and means under control of the operator while in driving position for varying the fluid pressure in said fluid-spring mechanism to correlate the action thereof to the weight of the load sustained thereby.

4. In a vehicle comprising load supporting means and springs supporting the same upon the running gear of the vehicle, fluid-spring mechanism carried by said load supporting means including power-multiplying lever mechanism and means upon said running gear positioned to be engaged by said lever mechanism only when the weight of the load flexes the springs beyond a predetermined amount, indicator mechanism connected to said lever mechanism and means for varying the fluid pressure in said fluid-spring mechanism to correlate the action thereof to the weight of the load sustained thereby.

5. In a vehicle comprising load supporting means, running gear and springs therebetween to permit relative movement thereof, and supplemental fluid-spring mechanism comprising a casing connected to one of said relatively movable means presenting a cylinder, a liquid-containing reservoir communicating with said cylinder, means for introducing air under pressure into said reservoir to maintain a pressure upon the liquid therein, a piston reciprocable in said cylinder and means connected with said piston operable by the movement of the other relatively movable member to force said piston against the resistance of the liquid in said cylinder and the liquid and air in said reservoir only when the weight of the load has flexed the springs beyond a predetermined amount.

6. In a vehicle comprising load supporting means, running gear and springs therebetween to permit relative movement thereof, and supplemental fluid-spring mechanism comprising a casing connected to one of said relatively movable means presenting a cylinder, a liquid-containing reservoir communicating with said cylinder, means for introducing air under pressure into said reservoir to maintain a pressure upon the liquid therein, a piston reciprocable in said cylinder, means connected with said piston operable by the movement of the other relatively movable member to force said piston against the resistance of the liquid in said cylinder and the liquid and air in said reservoir only when the weight of the load has flexed the springs beyond a predetermined amount and manually operable means under the control of the operator while in driving position for regulating the air pressure imposed upon the liquid in the reservoir and cylinder.

7. In a vehicle comprising load supporting means, running gear and springs therebetween to permit relative movement thereof, and supplemental fluid-spring mechanism comprising a casing connected to one of said relatively movable means presenting a cylinder, a liquid-containing reservoir communicating with said cylinder, means for introducing air under pressure into said reservoir to maintain a pressure upon the liquid therein, a piston reciprocable in said cylinder, a lever connected to said piston, means upon the other relatively movable member positioned to engage and actuate said lever upon flexure of said spring and means for normally maintaining said lever in a position in which it will not be so engaged until the spring has been flexed a predetermined amount.

8. In a vehicle comprising load supporting means, running gear and springs therebetween to permit relative movement thereof, and supplemental fluid-spring mechanism comprising a casing connected to one of said relatively movable means presenting a cylinder, a liquid-containing reservoir communicating with said cylinder, means for introducing air under pressure into said reservoir to maintain a pressure upon the liquid therein, a piston reciprocable in said cylinder, a lever connected to said piston, means upon the other relatively movable member positioned to engage and actuate said lever upon flexure of said spring, means for normally maintaining said lever in a position in which it will not be so engaged until the spring has been flexed a predetermined amount, indicating means connected to said lever and manually operable means for regulating the air pressure upon the liquid in the reservoir and cylinder, whereby the action of the fluid-spring mechanism may be correlated to the weight of the load imposed upon it.

9. In a vehicle comprising load supporting means, running gear and springs therebetween to permit relative movement thereof, and supplemental fluid-spring mechanism comprising a casing, connected to one of said relatively movable means, presenting a cylinder, a liquid-containing reservoir communicating with said cylinder, a valve intermediate of said cylinder and reservoir operable to permit free flow of liquid from the cylinder into the reservoir and having means to provide a restricted flow of liquid from the reservoir into the cylinder, means for introducing air under pressure upon the liquid therein, a piston reciprocable in said cylinder and means connected with said piston operable by the movement of the other relatively movable member to force said piston against the resistance of the fluid in said cylinder and reservoir, whereby a portion of the weight of the load will be supported upon said fluid-spring mechanism and rebounding movement of the springs will be checked by the restricted flow of liquid from the reservoir into the cylinder.

10. In a vehicle comprising load supporting means, running gear and springs therebetween to permit relative movement thereof, and supplemental fluid-spring mechanism comprising a casing connected to one of said relatively movable members presenting a liquid-containing reservoir and cylinder and a drip chamber to receive leakage of oil from said cylinder, means for introducing air under pressure into said reservoir to maintain pressure upon the liquid therein, a piston reciprocable in said cylinder and a pump communicating with said reservoir and said cylinder operable in conjunction with the movement of said piston to return liquid from said drip chamber to said cylinder and means operable by the relative movement of said load supporting means and running gear for actuating said piston.

11. In a vehicle comprising load supporting means, running gear and springs therebetween to permit relative movement thereof, and supplemental fluid-spring mechanism comprising a casing connected to one of said relatively movable members presenting a liquid-containing reservoir and cylinder and a drip chamber to receive leakage of oil from said cylinder, means for introducing air under pressure into said reservoir to maintain pressure upon the liquid therein, a piston reciprocable in said cylinder and a pump communicating with said reservoir and said cylinder operable in conjunction with the movement of said piston to return liquid from said drip chamber to said cylinder, a bell crank lever connected to said piston and pump and operable by the relative movement of said load supporting means and running gear to actuate said piston and said pump.

12. In a vehicle comprising load supporting means, running gear and springs therebetween to permit relative movement thereof, and supplemental fluid-spring mechanism comprising a casing connected to one of said relatively movable members presenting a liquid-containing reservoir and cylinder and a drip chamber to receive leakage of oil from said cylinder, means for introducing air under pressure into said reservoir to maintain pressure upon the liquid therein, a piston reciprocable in said cylinder and a pump communicating with said reservoir and said cylinder operable in conjunction with the movement of said piston to return liquid from said drip chamber to said cylinder, a bell crank lever connected to said piston and pump and operable by the relative movement of said load supporting means and running gear to actuate said piston and said pump, indicating mechanism connected to and operable by said bell crank lever and manually operable means for controlling the air pressure imposed upon the liquid in said reservoir.

13. In a vehicle comprising load supporting means, running gear and springs therebetween to permit relative movement thereof, and supplemental fluid-spring mechanism comprising a casing connected to said load supporting means presenting a liquid-containing reservoir and a cylinder communicating with said reservoir, means for introducing air under pressure into said reservoir to maintain pressure upon the liquid therein, a piston reciprocable in said cylinder, a bell crank lever connected to said piston, a cushioning device normally holding said lever in a predetermined position, a cushioning device carried by said running gear positioned to engage said lever only when the springs have been flexed a predetermined amount.

14. In a vehicle comprising load supporting means, running gear and springs therebetween to permit relative movement thereof, and supplemental fluid-spring mechanism comprising a liquid-containing reservoir, a plurality of cylinders communicating with said reservoir and located in proximity to the respective springs, means for introducing air under pressure into said reservoir to maintain pressure upon the liquid therein, pistons reciprocable in said cylinders and means connected with the respective pistons independently operable to force the respective pistons against the resistance of the fluid in said reservoir only when the weight of the load has flexed the respective springs beyond a predetermined amount.

In testimony whereof, I have signed my name to this specification.

RALPH M. LOVEJOY.